US008881144B1

(12) United States Patent
Banerjee et al.

(10) Patent No.: US 8,881,144 B1
(45) Date of Patent: Nov. 4, 2014

(54) SYSTEMS AND METHODS FOR RECLAIMING STORAGE SPACE FROM VIRTUAL MACHINE DISK IMAGES

(75) Inventors: Anindya Banerjee, Barrackpore (IN); Anirban Mukherjee, West Bengal (IN)

(73) Assignee: Symantec Corporation, Mountain View, CA (US)

( * ) Notice: Subject to any disclaimer, the term of this patent is extended or adjusted under 35 U.S.C. 154(b) by 342 days.

(21) Appl. No.: 13/302,813

(22) Filed: Nov. 22, 2011

(51) Int. Cl.
 G06F 9/46 (2006.01)
 G06F 12/00 (2006.01)
 G06F 12/02 (2006.01)
 G06F 11/14 (2006.01)

(52) U.S. Cl.
 CPC ........ G06F 12/0253 (2013.01); G06F 11/1484 (2013.01); G06F 9/461 (2013.01)
 USPC ................................ 718/1; 718/108; 707/813

(58) Field of Classification Search
 CPC . G06F 9/45537; G06F 11/1484; G06F 9/461; G06F 12/0253
 See application file for complete search history.

(56) References Cited

U.S. PATENT DOCUMENTS

| 8,650,299 | B1* | 2/2014 | Huang et al. | 709/226 |
| 2006/0288153 | A1* | 12/2006 | Tanaka et al. | 711/103 |
| 2009/0300301 | A1* | 12/2009 | Vaghani | 711/162 |
| 2012/0137101 | A1* | 5/2012 | Arcese et al. | 711/170 |

OTHER PUBLICATIONS

Gabrie Van Zanten; Reclaiming unused VMDK space with storage thin provisioning; searchvmware.techtarget.com/tip/Reclaiming-unused-VMDK-spacewith-storage-thin-provisioning; Jun. 2009.
Vinayak Shivdeo et al.; Systems and Methods for Recovering Virtual Machines After Disaster Scenarios; U.S. Appl. No. 13/233,534; filed Sep. 15, 2011.
VMware Communities; How do you restore VM images from snapshot?; communities.vmware.com/thread/141757; Apr. 25, 2008.
Blog.Scottlowe.Org; Full VM Recovery with NetApp Snapshots; blog.scottlowe.org/2007/10/08/full-vmrecovery-with-netapp-snapshots/; Oct. 8, 2007.

* cited by examiner

Primary Examiner — Camquy Truong
(74) Attorney, Agent, or Firm — ALG Intellectual Property, LLC (57) ABSTRACT

A computer-implemented method for reclaiming storage space from virtual machine disk images may include (1) identifying a virtual machine that uses a virtual machine disk image as a virtual disk for storage, the virtual machine disk image being stored on a thin-provisioned volume within a host file system, (2) determining that a portion of the virtual machine disk image represents a portion of the virtual disk that is unused by a file system of the virtual machine, (3) based on determining that the portion of the virtual machine disk image represents the portion of the virtual disk that is unused by the file system of the virtual machine, marking the portion of the virtual machine disk image for reclamation from the thin-provisioned volume, and (4) reclaiming the marked portion of the virtual machine disk image from the thin-provisioned volume. Various other methods, systems, and computer-readable media are also disclosed.

20 Claims, 6 Drawing Sheets

SYSTEMS AND METHODS FOR RECLAIMING STORAGE SPACE FROM VIRTUAL MACHINE DISK IMAGES

BACKGROUND

Organizations increasingly rely on virtualization technologies to improve the flexibility, efficiency, and stability of their data centers. One aspect of virtualization involves provisioning virtual machines with virtual disks for data storage. Virtual disks, like physical disks, may have unallocated space (e.g., unformatted disk regions) and/or unused space (e.g., formatted but unused).

Due to the potentially large amounts of data required to store virtual disks, an organization may wish to maximize data storage performance while minimizing the cost of storage by using thin-provisioning solutions. In an effort to efficiently utilize available storage space, thin-provisioning solutions typically allocate storage space from a common pool to computing systems on an as-needed or just-in-time basis in an effort to prevent storage space from going to waste. Thin-provisioning solutions may also later reclaim previously allocated storage space when it is no longer in use and/or required.

Unfortunately, virtual disk files may continue to consume storage space in host file systems even when virtual volumes no longer utilize all of the corresponding virtual disk space. Traditional thin-provisioning solutions may therefore fail to reclaim unused storage space at the virtualized level. Accordingly, the instant disclosure identifies a need for systems and methods for reclaiming storage space from virtual machine disk images.

SUMMARY

As will be described in greater detail below, the instant disclosure generally relates to systems and methods for reclaiming storage space from virtual machine disk images by identifying portions of virtual machine disk images stored on thin-provisioned volumes that represent unused portions of virtual disks and reclaiming the unused portions of the virtual machine disk images. In one example, a computer-implemented method for reclaiming storage space from virtual machine disk images may include (1) identifying a virtual machine that uses a virtual machine disk image as a virtual disk for storage, the virtual machine disk image being stored on a thin-provisioned volume within a host file system, (2) determining that a portion of the virtual machine disk image represents a portion of the virtual disk that is unused by a file system of the virtual machine, (3) based on determining that the portion of the virtual machine disk image represents the portion of the virtual disk that is unused by the file system of the virtual machine, marking the portion of the virtual machine disk image for reclamation from the thin-provisioned volume, and (4) reclaiming the marked portion of the virtual machine disk image from the thin-provisioned volume.

Determining that the portion of the virtual machine disk image represents a portion of the virtual disk that is unused by the file system of the virtual machine may include any of a variety of steps. For example, determining that the portion of the virtual machine disk image represents the unused portion of the virtual disk may include querying a virtualization system that implements the virtual machine for information identifying at least one portion of the virtual disk that is used by the file system of the virtual machine. Additionally or alternatively, determining that the portion of the virtual machine disk image represents the unused portion of the virtual disk may include receiving a communication from an agent running within the virtual machine identifying the portion of the virtual disk as unused by the file system of the virtual machine. In some examples, determining that the portion of the virtual machine disk image represents the unused portion of the virtual disk may include parsing the virtual machine disk image to locate unused portions based on a format of the virtual machine disk image. In one embodiment, determining that the portion of the virtual machine disk image represents the unused portion of the virtual disk may be performed in response to identifying a reclamation request received by the host file system.

In some examples, the computer-implemented method may also include pausing the virtual machine before determining that the portion of the virtual machine disk image represents the portion of the virtual disk that is unused by the file system of the virtual machine and resuming the virtual machine after reclaiming the marked portion. Additionally or alternatively, the computer-implemented method may also include taking a snapshot of the virtual machine disk image before determining that the portion of the virtual machine disk image represents the portion of the virtual disk that is unused by the file system of the virtual machine.

In one example, the computer-implemented method may also include (1) identifying an additional portion of the virtual machine disk image that represents a portion of the virtual disk that was used by the file system of the virtual machine to store a file that was subsequently deleted, (2) based on determining that the additional portion is unused by the file system of the virtual machine, marking the additional portion of the virtual machine disk image for reclamation from the thin-provisioned volume, and (3) reclaiming the marked additional portion of the virtual machine disk image from the thin-provisioned volume.

In some examples, the computer-implemented method may also include (1) identifying an attempt to read from the marked portion of the virtual machine disk image and (2) fulfilling the attempt with null data based on the marked portion being marked.

In one embodiment, a system for implementing the above-described method may include (1) an identification module programmed to identify a virtual machine that uses a virtual machine disk image as a virtual disk for storage, the virtual machine disk image being stored on a thin-provisioned volume within a host file system, (2) a determination module programmed to determine that a portion of the virtual machine disk image represents a portion of the virtual disk that is unused by a file system of the virtual machine, (3) a marking module programmed to, based on determining that the portion of the virtual machine disk image represents the portion of the virtual disk that is unused by the file system of the virtual machine, mark the portion of the virtual machine disk image for reclamation from the thin-provisioned volume, and (4) a reclamation module programmed to reclaim the marked portion of the virtual machine disk image from the thin-provisioned volume. The system may also include at least one processor configured to execute the identification module, the determination module, the marking module, and the reclamation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a virtual machine that uses a virtual machine disk image as a virtual disk for storage, the virtual machine disk image being stored on a thin-provisioned volume within a host file system, (2) determine that a portion of the virtual machine disk image represents a portion of the virtual disk that is unused by a file system of the virtual machine, (3) based on determining that the portion of the virtual machine disk image represents the portion of the virtual disk that is unused by the file system of the virtual machine, mark the portion of the virtual machine disk image for reclamation from the thin-provisioned volume, and (4) reclaim the marked portion of the virtual machine disk image from the thin-provisioned volume.

As will be explained in greater detail below, by identifying portions of virtual machine disk images stored on thin-provisioned volumes that represent unused portions of virtual disks and reclaiming the unused portions of the virtual machine disk images, the systems and methods described herein may facilitate greater reclamation of storage space from thin-provisioned volumes storing virtual machine disk files. Additionally, in some examples these systems and methods may reclaim storage space used for virtual machine disk images without reclaiming the storage space from within the corresponding virtual machines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
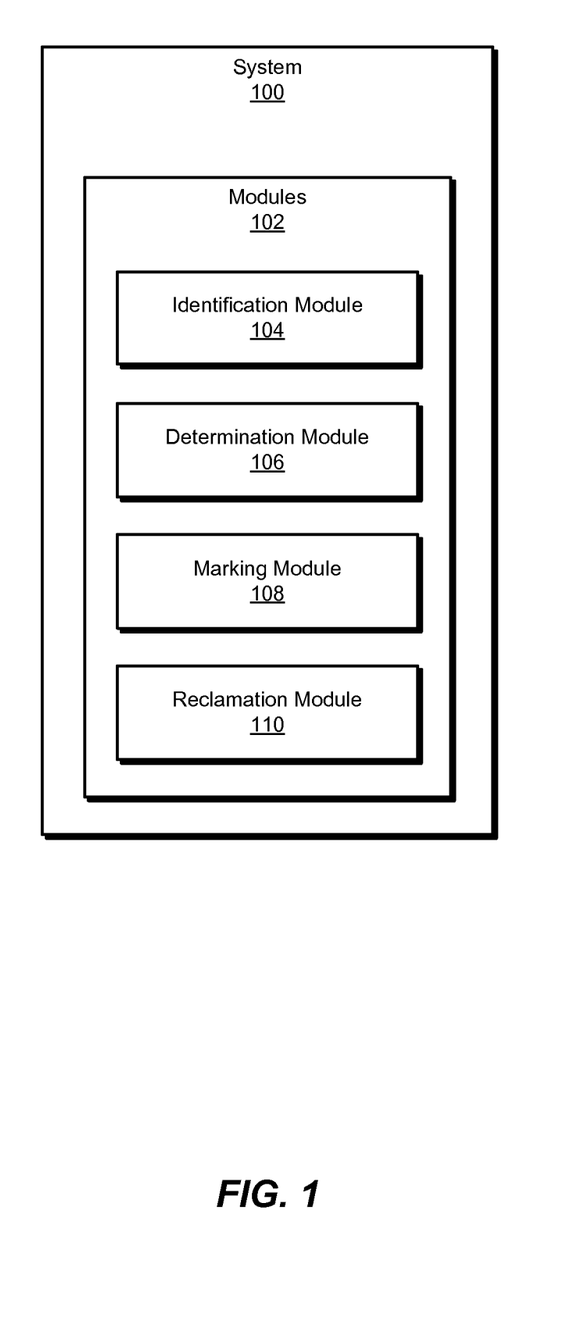
FIG. 1 is a block diagram of an exemplary system for reclaiming storage space from virtual machine disk images.
Figure 2:
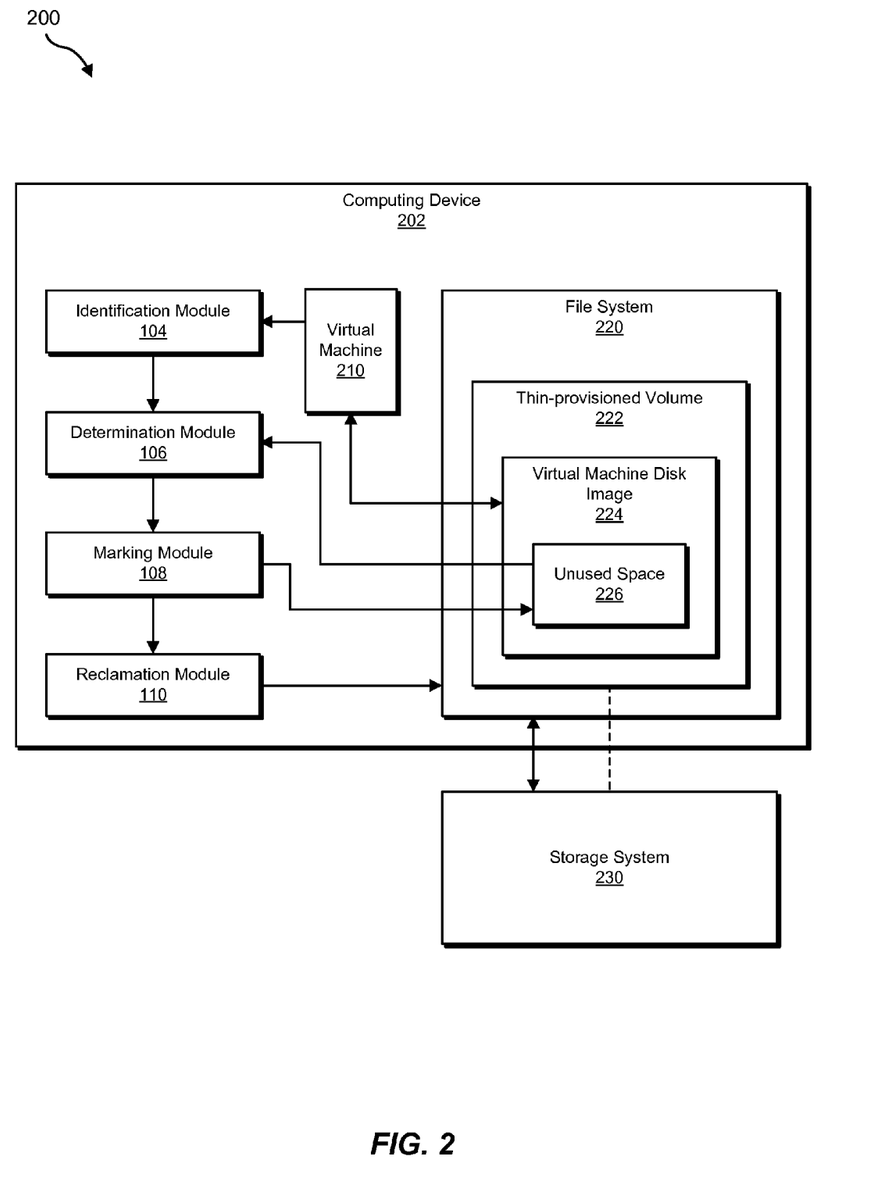
FIG. 2 is a block diagram of an exemplary system for reclaiming storage space from virtual machine disk images.

The following will provide, with reference to FIGS. 1-2, detailed descriptions of exemplary systems for reclaiming storage space from virtual machine disk images. Detailed descriptions of corresponding computer-implemented methods will also be provided in connection with FIG. 3. Detailed descriptions of an exemplary virtual disk will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for reclaiming storage space from virtual machine disk images. As illustrated in this figure, exemplary system 100 may include one or more modules 102 for performing one or more tasks. For example, and as will be explained in greater detail below, exemplary system 100 may include an identification module 104 programmed to identify a virtual machine that uses a virtual machine disk image as a virtual disk for storage, the virtual machine disk image being stored on a thin-provisioned volume within a host file system. Exemplary system 100 may also include a determination module 106 programmed to determine that a portion of the virtual machine disk image represents a portion of the virtual disk that is unused by a file system of the virtual machine. Exemplary system 100 may additionally include a marking module 108 programmed to, based on determining that the portion of the virtual disk image represents the portion of the virtual disk that is unused by the file system of the virtual machine, mark the portion of the virtual machine disk image for reclamation from the thin-provisioned volume.

In addition, and as will be described in greater detail below, exemplary system 100 may include a reclamation module 110 programmed to reclaim the marked portion of the virtual machine disk image from the thin-provisioned volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 230), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 hosting a virtual machine 210.

In one embodiment, one or more of modules 102 from FIG. 1 may, when executed by at least one processor of computing device 202, facilitate computing device 202 in reclaiming storage space from virtual machine disk images. For example, and as will be described in greater detail below, one or more of modules 102 may cause computing device 202 to (1) identify a virtual machine (e.g., virtual machine 210) that uses a virtual machine disk image (e.g., a virtual machine disk image 224) as a virtual disk for storage, the virtual machine disk image being stored on a thin-provisioned volume (e.g., a thin-provisioned volume 222) within a host file system (e.g., a file system 220), (2) determine that a portion of the virtual machine disk image represents a portion of the virtual disk that is unused by a file system of the virtual machine (e.g., determine that an unused space 226 within virtual machine disk image 224 represents a portion of the virtual disk that is unused by a file system of virtual machine 210), (3) based on determining that the portion of the virtual machine disk image represents the portion of the virtual disk that is unused by the file system of the virtual machine, mark the portion of the virtual machine disk image for reclamation from the thin-provisioned volume (e.g., mark unused space 226 for reclamation from thin-provisioned volume 222), and (4) reclaim the marked portion of the virtual machine disk image from the thin-provisioned volume (e.g., reclaim unused space 226 of virtual machine disk image 224 from thin-provisioned volume 222).

Computing device 202 generally represents any type or form of computing device capable of reading computer-executable instructions. Examples of computing device 202 include, without limitation, servers, desktops, hypervisors, laptops, cellular phones, personal digital assistants (PDAs), multimedia players, embedded systems, combinations of one or more of the same, exemplary computing system 510 in FIG. 5, or any other suitable computing device.

Storage system 230 may represent portions of a single storage or computing device or a plurality of storage or computing devices. For example, storage system 230 may represent a portion of computing system 510 in FIG. 5 and/or portions of exemplary network architecture 600 in FIG. 6. Alternatively, storage system 230 in FIG. 1 may represent one or more physically separate devices capable of being accessed by a computing device, such as computing system 510 in FIG. 5 and/or portions of exemplary network architecture 600 in FIG. 6. In some examples, storage system 230 may represent a storage array supporting thin provisioning.

Figure 3:
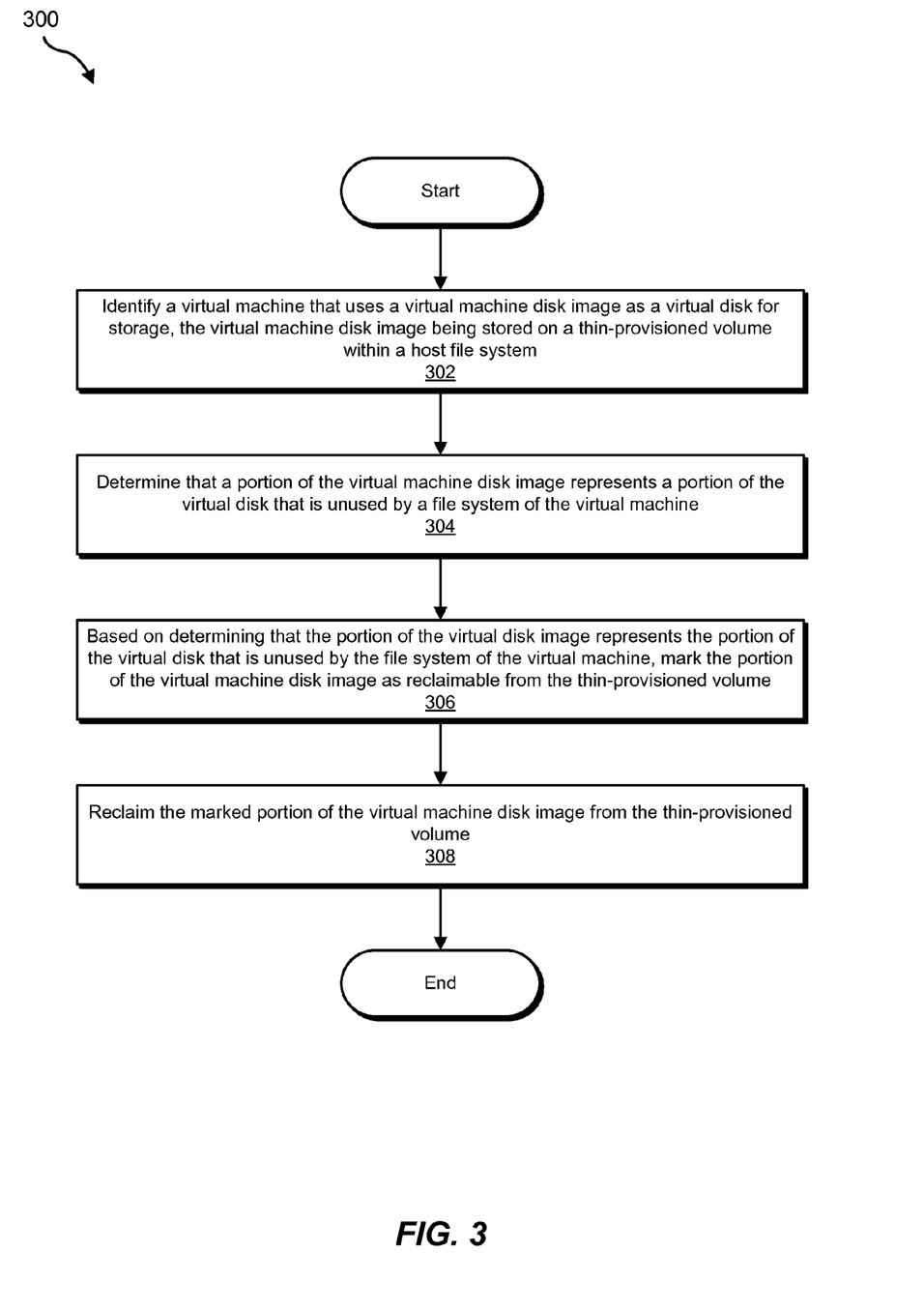
FIG. 3 is a flow diagram of an exemplary method for reclaiming storage space from virtual machine disk images.

FIG. 3 is a flow diagram of an exemplary computer-implemented method 300 for reclaiming storage space from virtual machine disk images. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a virtual machine that uses a virtual machine disk image as a virtual disk for storage, the virtual machine disk image being stored on a thin-provisioned volume within a host file system. For example, at step 302 identification module 104 may, as part of computing device 202 in FIG. 2, identify virtual machine 210 using virtual machine disk image 224 as a virtual disk. In this example, virtual machine disk image 224 may be stored on thin-provisioned volume 222 within file system 220.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the phrase "virtual machine disk image" may refer to any file and/or image containing data stored for the use of a virtual machine. In some examples, the data as stored within the virtual machine disk image may reflect the raw contents and/or structure of a virtual storage device. For example, the phrase "virtual machine disk image" may refer to any data structure that may be interpreted by a virtual machine as a disk or other physical storage medium (e.g., a solid-state storage device), In one example, the phrase "virtual machine disk image" may refer to a VMWARE VIRTUAL MACHINE DISK ("VMDK").

As used herein, the phrase "thin-provisioned volume" may refer to a volume for which storage space is allocated on an as-needed and/or just-in-time basis. Additionally or alternatively, the phrase "thin-provisioned volume" may refer to a volume that may represent more available storage space than is exclusively allocated for the volume. In some examples, the phrase "thin-provisioned volume" may refer to a volume using storage space allocated from a common storage pool (e.g., with other thin-provisioned volumes).

As used herein, the phrase "file system" may refer to any system for organizing, managing, and/or storing files. Accordingly, the phrase "host file system" may refer to a file system storing a virtual machine disk image which may be accessed as a virtual disk by a virtual file system.

Identification module 104 may identify the virtual machine in any suitable manner. For example, identification module 104 may read a configuration file and/or receive a message identifying the virtual machine. Additionally or alternatively, identification module 104 may identify the virtual machine by identifying the virtual machine disk image. For example, identification module 104 may scan the host file system for virtual machine disk images in order to reclaim storage space from the virtual machine disk images.

Figure 4:
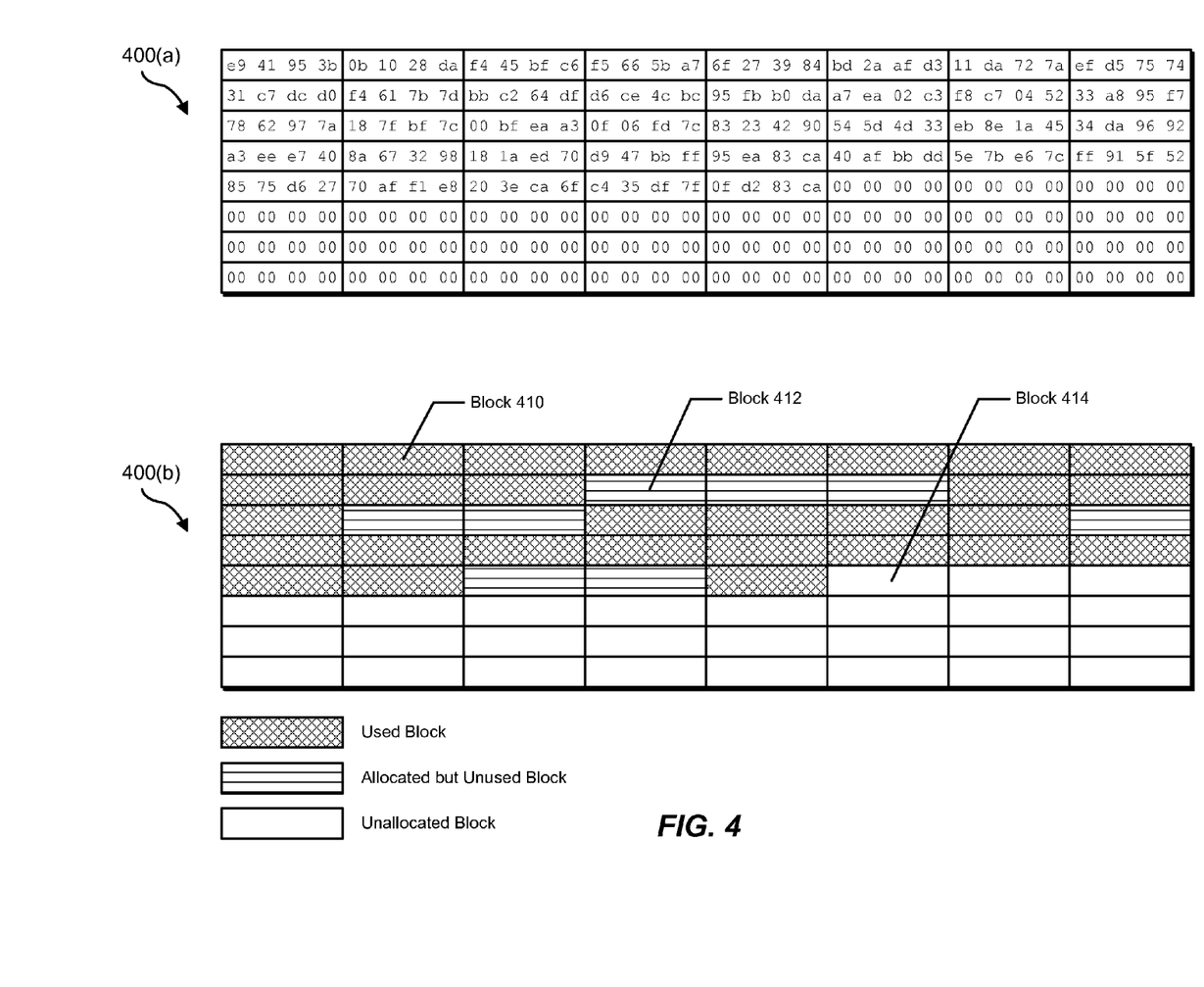
FIG. 4 is a diagram of an exemplary virtual disk.

FIG. 4 is an illustration of an exemplary virtual machine disk image 400(a) and an exemplary block map 400(b) of virtual machine disk image 400(a). As shown in FIG. 4, block map 400(b) may indicate which blocks of virtual machine disk image 400(a) represent blocks of a virtual disk that are unused within a virtual machine. Using FIG. 4 as an example, at step 302 identification module 104 may identify virtual machine disk image 400(a).

Returning to FIG. 3, at step 304 one or more of the systems described herein may determine that a portion of the virtual machine disk image represents a portion of the virtual disk that is unused by a file system of the virtual machine. For example, at step 304 determination module 106 may, as part of computing device 202 in FIG. 2, determine that unused space 226 within virtual machine disk image 224 represents a portion of the virtual disk that is unused by a file system of virtual machine 210.

As used herein, the term "unused" as applied to virtual disk space may refer to any space that is currently unneeded for storage and/or could be safely reclaimed. For example, the term "unused" as applied to virtual disk space may refer to any space that is managed by, accessible to, and/or under the control of a file system of a virtual machine but which is not currently used by the file system to store data.

Determination module 106 may determine that the portion of the virtual machine disk image represents the portion of the virtual disk that is unused by the file system of the virtual machine in any of a variety of ways. For example, determination module 106 may query a virtualization system that implements the virtual machine for information identifying at least one portion of the virtual disk that is used by the file system of the virtual machine. As used herein, the phrase "virtualization system" may refer to any virtualization platform. For example, the phrase "virtualization system" may refer to virtualization software, a hypervisor, and/or a virtual machine manager. In some examples, determination module 106 may use an application programming interface ("API") of the virtualization system to query the virtualization system. In one example, determination module 106 may query VMWARE ESX by using a "QueryChangedDiskAreas"

method call with the parameter "*". Determination module 106 may then receive a list of all blocks of the virtual disk that are in use. Determination module 106 may then invert the list of used blocks to derive a list of unused blocks and translate the list of unused blocks within the virtual disk into a list of corresponding blocks in the virtual machine disk image. In some examples, determination module 106 may identify the disk capacity of the virtual disk as a part of determining which blocks within the virtual disk represent unused blocks within the virtual machine disk image.

In some examples, determination module 106 may determine that the portion of the virtual machine disk image represents the portion of the virtual disk that is unused by the file system of the virtual machine by receiving a communication from an agent running within the virtual machine identifying the portion of the virtual disk as unused by the file system of the virtual machine. For example, determination module 106 may inject the agent into the virtual machine. Additionally or alternatively, determination module 106 may operate as a part of the agent within the virtual machine. The agent may communicate with the file system within the virtual machine (the "guest file system") to gather information regarding unused virtual disk space. For example, the agent may identify virtual disk space that is not allocated to any volume within the guest file system. Additionally or alternatively, the agent may identify virtual disk space that is allocated to a volume but which is not in use for storing data. In some examples, the agent may identify virtual disk space that stores data of deleted files within the guest file system.

In some examples, determination module 106 may determine that the portion of the virtual machine disk image represents the portion of the virtual disk that is unused by the file system of the virtual machine by parsing the virtual machine disk image to locate unused portions based on a format of the virtual machine disk image. For example, determination module 106 may parse the virtual machine disk image for metadata structures (e.g., partition maps, inode tables, inodes, etc.). Determination module 106 may then analyze and/or crawl through the metadata structures to determine which portions of the virtual machine disk image are unused by a guest file system within the virtual machine.

Determination module 106 may also perform one or more additional steps to prepare the virtual machine disk image for analysis (e.g., in order to ensure a consistent view of the virtual machine disk image and/or to ensure safe reclamation of space from the virtual machine disk image). For example, determination module 106 may pause the virtual machine before determining that the portion of the virtual machine disk image represents the portion of the virtual disk that is unused by the file system of the virtual machine. Determination module 106 may pause the virtual machine in any suitable manner. For example, determination module 106 may issue a pause command via an API to a virtualization system hosting the virtual machine. As will be explained in greater detail below, one or more of the systems described herein may resume the virtual machine after reclaiming the unused portion of the virtual machine disk image is reclaimed.

In some examples, determination module 106 may take a snapshot of the virtual machine disk image before determining that the portion of the virtual machine disk image represents the portion of the virtual disk that is unused by the file system of the virtual machine. Determination module 106 may thereby create a point-in-time view of the virtual machine disk image on which to operate. As used herein, the term "snapshot" may refer to any representation of a volume and/or a portion of a volume in a certain state and/or point in time. In some examples, a "snapshot" may refer to a space-saving snapshot (e.g., a snapshot that references a primary volume for unchanged data) and/or a copy-on-write snapshot (e.g., a snapshot that copies protected data as it existed at the time of the snapshot before overwriting the protected data in order to preserve a point-in-time copy of the data). In some examples, the snapshot may include a block-level snapshot (e.g., copying and/or preserving changed blocks).

In some examples, determination module 106 may lock the virtual machine disk image from writes before determining that the portion of the virtual machine disk image represents the portion of the virtual disk that is unused by the file system of the virtual machine.

Determination module 106 may perform step 304 in any of a variety of contexts. For example, determination module 106 may determine that the portion of the virtual machine disk image represents the portion of the virtual disk that is unused by the file system of the virtual machine in response to identifying a reclamation request received by the host file system. For example, determination module 106 may operate as a part of the host file system and/or receive a message from the host file system and/or intended for the host file system requesting and/or instructing the reclamation of storage space from one or more volumes accessed by the host file system. Additionally or alternatively, determination module 106 may monitor virtual machine disk images on the host file system for changes and identify potential reclamation opportunities by analyzing these changes.

In some examples, determination module 106 may also identify an additional portion of the virtual machine disk image that represents a portion of the virtual disk that was used by the file system of the virtual machine to store a file that was subsequently deleted. For example, the portion of the virtual disk may store the contents of the deleted file even though the file has been marked as deleted within the guest file system. In this example, as will be described in greater detail below, while the portion of the virtual disk may still store the contents of the deleted file, determination module 106 may identify the additional portion of the virtual machine disk image so that one or more of the systems and methods described herein may reclaim it.

Using FIG. 4 as an example, determination module 106 may determine that a portion of virtual machine disk image 400(*a*) represents a portion of a virtual disk that is unused by a file system. For example, determination module 106 may generate block map 400(*b*) of virtual machine disk image 400(*a*) (e.g., based on API calls to a virtualization system, receiving information from an agent running within a virtual machine, parsing virtual machine disk image 400(*a*), etc.). Accordingly, determination module 106 may determine that a block 410 of virtual machine disk image 400(*a*) is used by a guest file system and therefore not available for reclamation. Determination module 106 may also determine that a block 412 is allocated but unused by a guest file system and therefore determine that block 412 is available for reclamation. Determination module 106 may also determine that a block 414 is unallocated by a guest file system and therefore determine that block 414 is available for reclamation.

Returning to FIG. 3, at step 306 one or more of the systems described herein may, based on determining that the portion of the virtual machine disk image represents the portion of the virtual disk that is unused by the file system of the virtual machine, mark the portion of the virtual machine disk image for reclamation from the thin-provisioned volume. For example, at step 306 marking module 108 may, as part of computing device 202 in FIG. 2, based on determining that unused space 226 within virtual machine disk image 224 represents a portion of the virtual disk that is unused by a file system of virtual machine 210, mark unused space 226 for reclamation from thin-provisioned volume 222.

Marking module 108 may mark the portion of the virtual machine disk image for reclamation in any suitable manner. For example, marking module 108 may mark the portion of the virtual machine disk image as a hole (or "punch a hole") within the virtual machine disk image within the host file system. For example, marking module 108 may communicate with the host file system to reassign the portion of the virtual machine disk image as a hole. The host file system may then alter an inode corresponding to the portion of the virtual machine disk image (e.g., by storing a reserved value indicating a hole within the inode pointer data structure instead of an address pointing to one or more data blocks). Additionally or alternatively, marking module 108 may mark the portion of the virtual machine disk image for reclamation by marking one or more blocks and/or extents corresponding to the portion of the virtual machine disk image with an attribute indicating that the block and/or extent is reclaimable. In some examples, marking module 108 may mark the portion of the virtual machine disk image for reclamation by adding the portion of the virtual machine disk image to a list of blocks and/or extents within the host file system to be reclaimed.

As mentioned earlier, in some examples, one or more of the systems described herein may identify an additional portion of the virtual machine disk image that represents a portion of the virtual disk that was used by the file system of the virtual machine to store a file that was subsequently deleted. In these examples, marking module 108 may, based on determining that the additional portion is unused by the file system of the virtual machine (e.g., because the additional portion only represents a deleted file), mark the additional portion of the virtual machine disk image for reclamation from the thin-provisioned volume.

Returning to FIG. 3, at step 308 one or more of the systems described herein may reclaim the marked portion of the virtual machine disk image from the thin-provisioned volume. For example, at step 308 reclamation module 110 may, as part of computing device 202 in FIG. 2, reclaim unused space 226 of virtual machine disk image 224 from thin-provisioned volume 222.

Reclamation module 110 may reclaim the marked portion of the virtual machine disk image in any suitable manner. For example, reclamation module 110 may send a message to a thin-provisioning system and/or device (e.g., a thin-provisioning-capable storage array) identifying the marked portion as available and/or reclaimed. Accordingly, the underlying storage space previously used to store the marked portion of the virtual machine disk image may no longer be allocated to the thin-provisioned volume.

In some examples, subsequent attempts to read from the marked portions may be fulfilled with null data. For example, one or more of the systems described herein may identify an attempt to read from the marked portion of the virtual machine disk image. These systems may then fulfill the attempt with null data based on the marked portion being marked (e.g., as a hole within the virtual machine disk image). In this manner, a read attempt performed on the virtual disk by the virtual machine, which may result in a read attempt performed on the virtual machine disk image within the host file system, may return null data to the requesting application within the virtual machine. Because the corresponding space within the virtual disk is unused and/or unallocated, returning null data may match with an expected result on the virtual machine. As used herein, the phrase "null data" may refer to any data which may be received in response to a request to read from an unused and/or unallocated portion of a disk (e.g., a string of zeroes).

In some examples, subsequent attempts to write to the marked portions may be fulfilled by first reallocating space for the write attempts. For example, one or more of the systems described herein (e.g., the host file system) may identify an attempt to write to the marked portion of the virtual machine disk image. These systems may then allocate space for the marked portion to the thin-provisioned volume before allowing the write attempt.

As mentioned earlier, in some examples one or more of the systems described herein may pause the virtual machine before determining that the portion of the virtual machine disk image represents the portion of the virtual disk that is unused by the file system of the virtual machine. In these examples, reclamation module 110 may resume the virtual machine after reclaiming the marked portion (e.g., allowing the virtual machine to resume after assuring a consistent view of the virtual machine disk image during analysis and reclamation).

As mentioned earlier, in some examples, one or more of the systems described herein may identify an additional portion of the virtual machine disk image that represents a portion of the virtual disk that was used by the file system of the virtual machine to store a file that was subsequently deleted and, based on determining that the additional portion is unused by the file system of the virtual machine (e.g., because the additional portion only represents a deleted file), mark the additional portion of the virtual machine disk image for reclamation from the thin-provisioned volume. In these examples, reclamation module 110 may also reclaim the marked additional portion of the virtual machine disk image from the thin-provisioned volume.

As explained above, by identifying portions of virtual machine disk images stored on thin-provisioned volumes that represent unused portions of virtual disks and reclaiming the unused portions of the virtual machine disk images, the systems and methods described herein may facilitate greater reclamation of storage space from thin-provisioned volumes storing virtual machine disk files. Additionally, in some examples these systems and methods may reclaim storage space used for virtual machine disk images without reclaiming the storage space from within the corresponding virtual machines.

Figure 5:
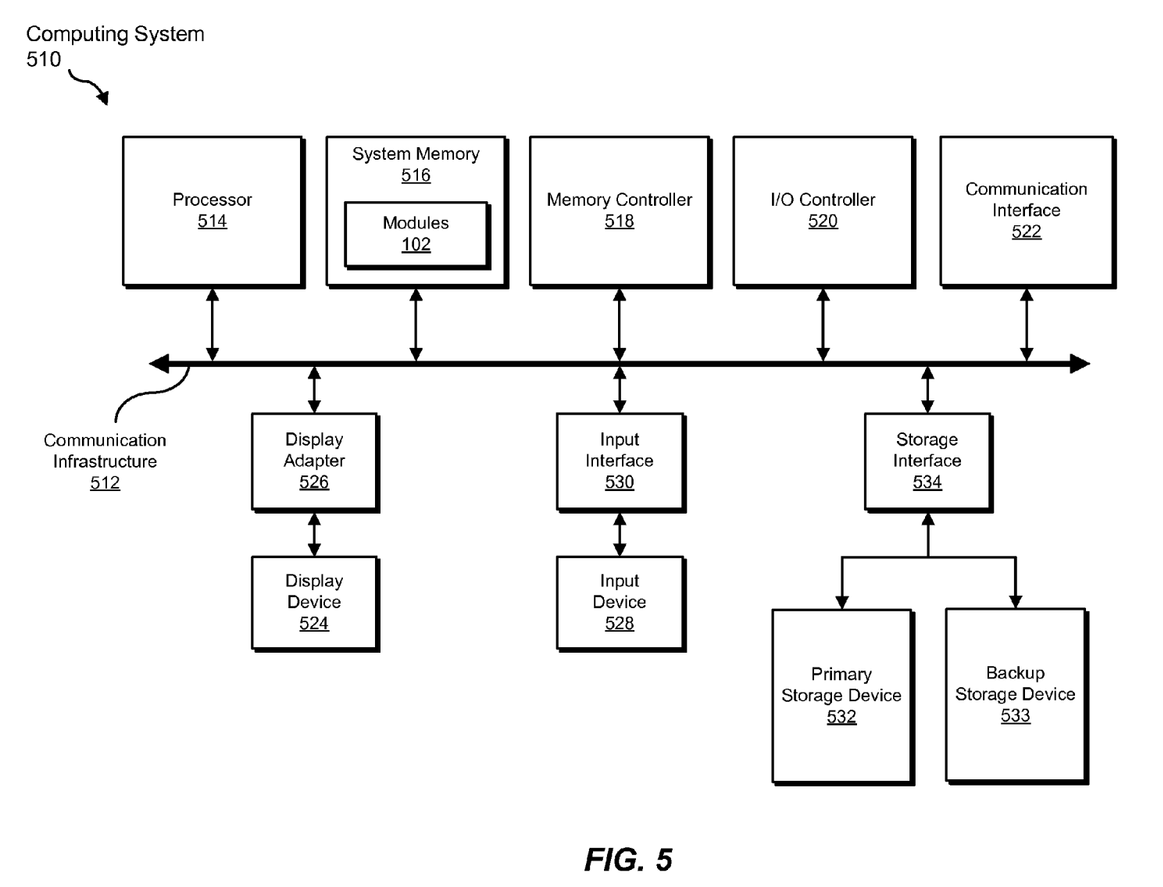
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, querying, receiving, parsing, pausing, taking, marking, fulfilling, resuming, and/or reclaiming steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
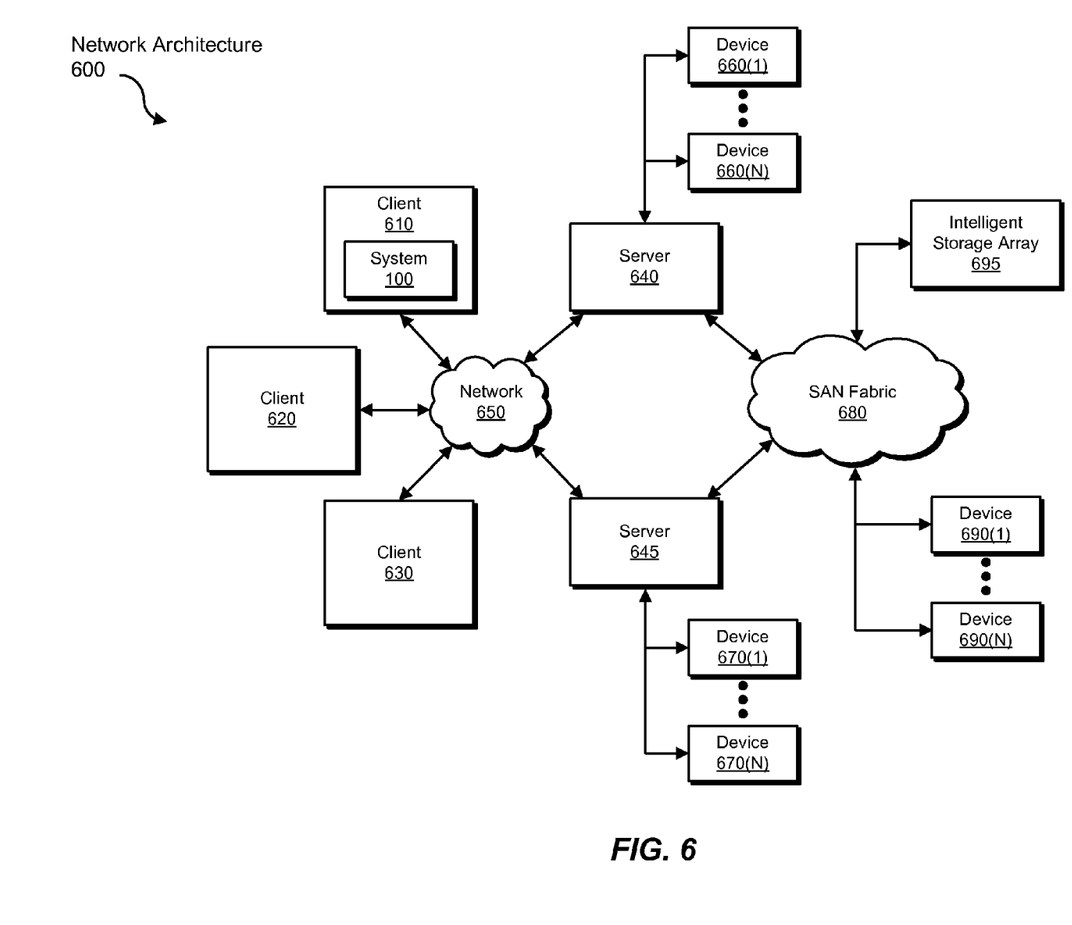
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, querying, receiving, parsing, pausing, taking, marking, fulfilling, resuming, and/or reclaiming steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for reclaiming storage space from virtual machine disk images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.)

may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for reclaiming storage space from virtual machine disk images. As another example, one or more of the modules recited herein may transform a virtual machine disk image into a sparse virtual machine disk image. As an additional example, one or more of the modules recited herein may transform a storage device into a storage device for efficiently allocating storage space for virtual machine disk images.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reclaiming storage space from virtual machine disk images, at least a portion of the method being performed by a computing device comprising at least one processor, the method comprising:
    identifying a virtual machine that uses a virtual machine disk image as a virtual disk for storage, the virtual machine disk image being stored on a thin-provisioned volume within a host file system;
    pausing the virtual machine;
    after pausing the virtual machine, determining that a portion of the virtual machine disk image represents a portion of the virtual disk that is unused by a file system of the virtual machine, wherein determining that the portion of the virtual machine disk image represents the portion of the virtual disk that is unused by the file system of the virtual machine comprises querying a virtualization system that implements the virtual machine for information identifying at least one portion of the virtual disk that is used by the file system of the virtual machine;
    based on determining that the portion of the virtual machine disk image represents the portion of the virtual disk that is unused by the file system of the virtual machine, marking the portion of the virtual machine disk image for reclamation from the thin-provisioned volume, wherein marking the portion of the virtual machine disk image for reclamation from the thin-provisioned volume comprises punching a hole within the virtual machine disk image within the host file system;
    reclaiming the marked portion of the virtual machine disk image from the thin-provisioned volume;
    resuming the virtual machine after reclaiming the marked portion.

2. The computer-implemented method of claim 1, further comprising:
    identifying an attempt to read from the marked portion of the virtual machine disk image;
    fulfilling the attempt with null data based on the marked portion being marked.

3. The computer-implemented method of claim 1, further comprising:
    identifying an additional portion of the virtual machine disk image that represents a portion of the virtual disk that was used by the file system of the virtual machine to store a file that was subsequently deleted;
    based on determining that the additional portion is unused by the file system of the virtual machine, marking the additional portion of the virtual machine disk image for reclamation from the thin-provisioned volume;
    reclaiming the marked additional portion of the virtual machine disk image from the thin-provisioned volume.

4. The computer-implemented method of claim 1, wherein determining that the portion of the virtual machine disk image represents the portion of the virtual disk that is unused by the file system of the virtual machine comprises receiving a communication from an agent running within the virtual machine identifying the portion of the virtual disk as unused by the file system of the virtual machine.

5. The computer-implemented method of claim 1, wherein determining that the portion of the virtual machine disk image represents the portion of the virtual disk that is unused by the file system of the virtual machine is performed in response to identifying a reclamation request received by the host file system.

6. The computer-implemented method of claim 1, wherein determining that the portion of the virtual machine disk image represents the portion of the virtual disk that is unused by the file system of the virtual machine comprises parsing the virtual machine disk image to locate unused portions based on a format of the virtual machine disk image.

7. The computer-implemented method of claim 1, further comprising taking a snapshot of the virtual machine disk image before determining that the portion of the virtual machine disk image represents the portion of the virtual disk that is unused by the file system of the virtual machine.

8. A system for reclaiming storage space from virtual machine disk images, the system comprising:
- an identification module programmed to identify a virtual machine that uses a virtual machine disk image as a virtual disk for storage, the virtual machine disk image being stored on a thin-provisioned volume within a host file system;
- a determination module programmed to:
  - pause the virtual machine;
  - after pausing the virtual machine, determine that a portion of the virtual machine disk image represents a portion of the virtual disk that is unused by a file system of the virtual machine, wherein determining that the portion of the virtual machine disk image represents the portion of the virtual disk that is unused by the file system of the virtual machine comprises querying a virtualization system that implements the virtual machine for information identifying at least one portion of the virtual disk that is used by the file system of the virtual machine;
- a marking module programmed to, based on determining that the portion of the virtual machine disk image represents the portion of the virtual disk that is unused by the file system of the virtual machine, mark the portion of the virtual machine disk image for reclamation from the thin-provisioned volume, wherein marking the portion of the virtual machine disk image for reclamation from the thin-provisioned volume comprises punching a hole within the virtual machine disk image within the host file system;
- a reclamation module programmed to:
  - reclaim the marked portion of the virtual machine disk image from the thin-provisioned volume;
  - resume the virtual machine after reclaiming the marked portion;
- at least one hardware processor configured to execute the identification module, the determination module, the marking module, and the reclamation module.

9. The system of claim 8, further comprising a fulfillment module programmed to:
- identify an attempt to read from the marked portion of the virtual machine disk image;
- fulfill the attempt with null data based on the marked portion being marked.

10. The system of claim 8, wherein:
- the identification module is further programmed to identify an additional portion of the virtual machine disk image that represents a portion of the virtual disk that was used by the file system of the virtual machine to store a file that was subsequently deleted;
- the determination module is further programmed to, based on determining that the additional portion is unused by the file system of the virtual machine, mark the additional portion of the virtual machine disk image for reclamation from the thin-provisioned volume;
- the reclamation module is further programmed to reclaim the marked additional portion of the virtual machine disk image from the thin-provisioned volume.

11. The system of claim 8, wherein the determination module is programmed to determine that the portion of the virtual machine disk image represents the portion of the virtual disk that is unused by the file system of the virtual machine by receiving a communication from an agent running within the virtual machine identifying the portion of the virtual disk as unused by the file system of the virtual machine.

12. The system of claim 8, wherein the determination module is programmed to determine that the portion of the virtual machine disk image represents the portion of the virtual disk that is unused by the file system of the virtual machine in response to identifying a reclamation request received by the host file system.

13. The system of claim 8, wherein the determination module is programmed to determine that the portion of the virtual machine disk image represents the portion of the virtual disk that is unused by the file system of the virtual machine by parsing the virtual machine disk image to locate unused portions based on a format of the virtual machine disk image.

14. The system of claim 8, wherein the determination module is further programmed to take a snapshot of the virtual machine disk image before determining that the portion of the virtual machine disk image represents the portion of the virtual disk that is unused by the file system of the virtual machine.

15. A non-transitory computer-readable-storage medium comprising one or more computer-executable instructions that, when executed by at least one processor of a computing device, cause the computing device to:
- identify a virtual machine that uses a virtual machine disk image as a virtual disk for storage, the virtual machine disk image being stored on a thin-provisioned volume within a host file system;
- pause the virtual machine;
- after pausing the virtual machine, determine that a portion of the virtual machine disk image represents a portion of the virtual disk that is unused by a file system of the virtual machine, wherein determining that the portion of the virtual machine disk image represents the portion of the virtual disk that is unused by the file system of the virtual machine comprises querying a virtualization system that implements the virtual machine for information identifying at least one portion of the virtual disk that is used by the file system of the virtual machine;
- based on determining that the portion of the virtual machine disk image represents the portion of the virtual disk that is unused by the file system of the virtual machine, mark the portion of the virtual machine disk image for reclamation from the thin-provisioned volume, wherein marking the portion of the virtual machine disk image for reclamation from the thin-provisioned volume comprises punching a hole within the virtual machine disk image within the host file system;
- reclaim the marked portion of the virtual machine disk image from the thin-provisioned volume;
- resume the virtual machine after reclaiming the marked portion.

16. The computer-readable-storage medium of claim 15, wherein the one or more computer-executable instructions further cause the computing device to:
- identify an attempt to read from the marked portion of the virtual machine disk image;
- fulfill the attempt with null data based on the marked portion being marked.

17. The computer-readable-storage medium of claim 15, wherein the one or more computer-executable instructions further cause the computing device to:
- identifying an additional portion of the virtual machine disk image that represents a portion of the virtual disk that was used by the file system of the virtual machine to store a file that was subsequently deleted;
- based on determining that the additional portion is unused by the file system of the virtual machine, marking the additional portion of the virtual machine disk image for reclamation from the thin-provisioned volume;

reclaiming the marked additional portion of the virtual machine disk image from the thin-provisioned volume.

18. The computer-readable-storage medium of claim 15, wherein the one or more computer-executable instructions cause the computing device to determine that the portion of the virtual machine disk image represents the portion of the virtual disk that is unused by the file system of the virtual machine by causing the computing device to receive a communication from an agent running within the virtual machine identifying the portion of the virtual disk as unused by the file system of the virtual machine.

19. The computer-readable-storage medium of claim 15, wherein the one or more computer-executable instructions cause the computing device to determine that the portion of the virtual machine disk image represents the portion of the virtual disk that is unused by the file system of the virtual machine in response to identifying a reclamation request received by the host file system.

20. The computer-readable-storage medium of claim 15, wherein the one or more computer-executable instructions cause the computing device to determine that the portion of the virtual machine disk image represents the portion of the virtual disk that is unused by the file system of the virtual machine by causing the computing device to parse the virtual machine disk image to locate unused portions based on a format of the virtual machine disk image.

* * * * *